July 1, 1930.  G. A. MONTGOMERY  1,769,381
PIPE COUPLING AND ROTARY TOOL JOINT
Filed June 14, 1928  2 Sheets-Sheet 1
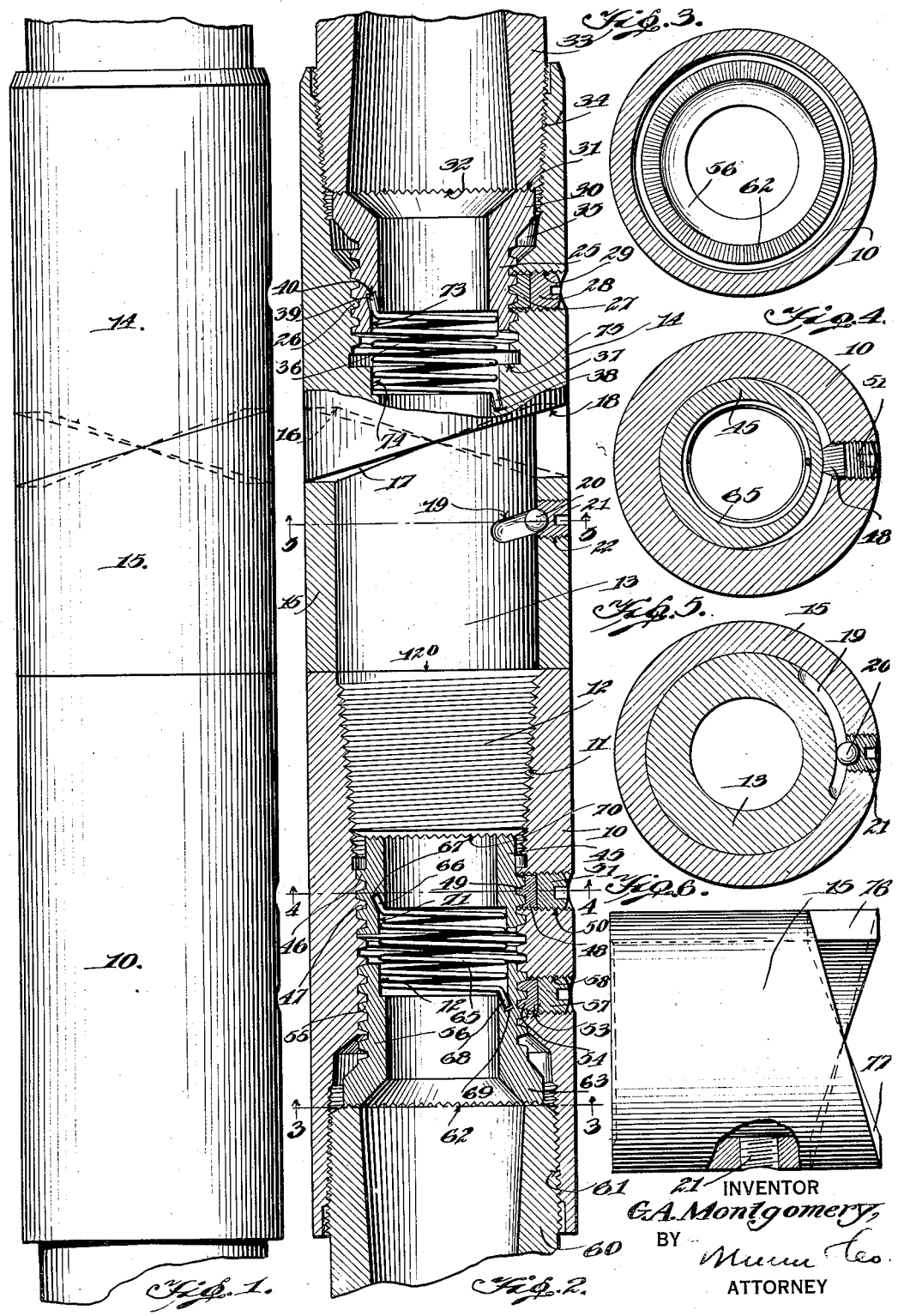

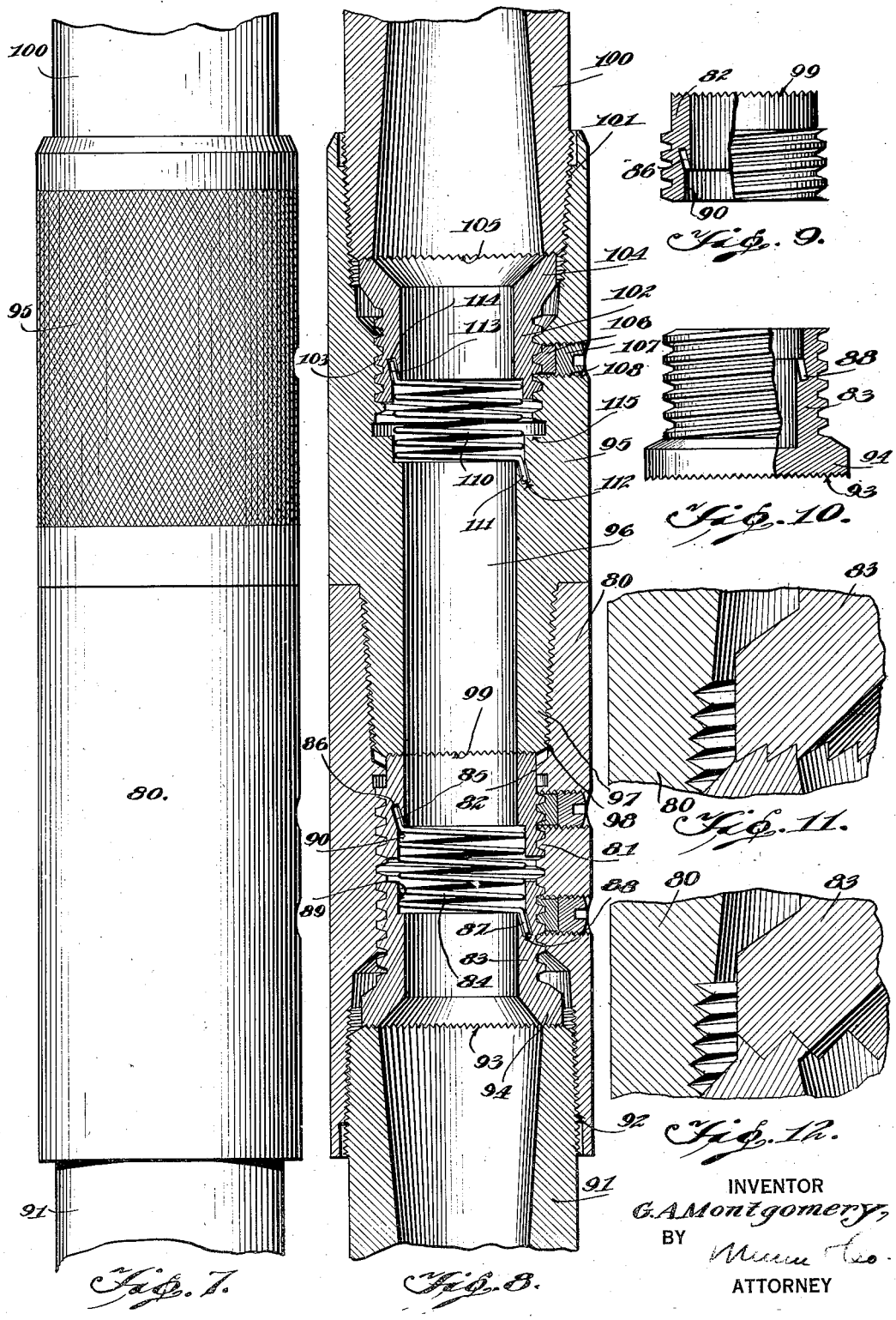

Patented July 1, 1930

1,769,381

UNITED STATES PATENT OFFICE

GUSTAVUS A. MONTGOMERY, OF DALLAS, TEXAS

PIPE COUPLING AND ROTARY TOOL JOINT

Application filed June 14, 1928. Serial No. 285,387.

This invention relates to pipe couplings and rotary tool joints.

The object of the invention is the provision of a connection for pipe and rotary tools having the usual threaded portions operating in conjunction with threaded portions of varying pitch, and a torsion spring for converting a connection having a single direction of rotation into one provided with right and left hand torsional features without in any manner affecting the capacity of the joint for permitting the passage of fluid.

A further object of the invention is the provision of a coupling or tool joint in which a plurality of threaded sections are screwed into each other with the threaded sections having a differential pitch, and means for locking certain of the sections against independent rotation.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a view in elevation of one form of the joint,

Figure 2 is a vertical section of the joint shown in Fig. 1,

Figure 3 is a horizontal section taken along the line 3—3 of Fig. 2,

Figure 4 is a horizontal section taken along the line 4—4 of Fig. 2,

Figure 5 is a horizontal section taken along the line 5—5 of Fig. 2,

Figure 6 is a side view of a coupling member,

Figure 7 is a longitudinal vertical view of a modified form of coupling,

Figure 8 is a vertical section of the coupling shown in Fig. 7,

Figure 9 is a view in elevation, partly in section, of a locking means,

Figure 10 is a view in elevation, partly in section, of a complementary locking member adapted to be actuated by a spring, Figure 11 is a fragmentary vertical section showing a modified form of the fixed ends of a pair of coupling members, Figure 12 is a fragmentary vertical section of a modified form showing cooperating teeth of a pair of coupling members.

Referring more particularly to the drawings, 10 designates a sleeve having an internally threaded and tapered portion 11 adapted to receive the threads of a complementarily tapered portion 12 of a reduced portion 13 of a body member 14. A calm sleeve 15 is mounted on the reduced portion 13 of the body member 14 and has a cam member 16 cooperating with the complementarily formed cam member 17 formed on a shoulder 18 where the reduced portion 13 is joined to the body member 14. The cam sleeve 15 has a limited rotary movement on the member 13 by means of an arcuately shaped groove 19, and a ball 20 located in the groove and held in place by means of a plug 21 threaded into a socket 22 formed in the cam sleeve 15.

A ring 25 is externally threaded and adapted to engage the threads 26 on the internal face of the upper end of the hollow body 14. These threads have a greater pitch than the threads 11. A pin 27 has threads adapted to engage the threads of the ring 25. Said pin is locked in place by a plug 28 threaded into a socket 29. The ring is expanded, as shown at 30, and provided with teeth 31 at its outer end adapted to engage teeth 32 on the inner end of the pipe 33 which is threaded at 34 into the body member 14. A central passage in the body member 14 is enlarged at 35 where the expanded portion of the ring 25 is disposed and where the end of the pipe 33 is threaded into said body member.

A coil spring 36 is mounted in the body member 14 and has one end 37 located within a socket 38 for securing said end of the spring in position. The other end 39 of the spring is located within a socket 40 for securing said ends of the spring against movement. The socket 40 is formed in the ring 25 whereby the spring 26 will tend to rotate the ring 25, as will be presently explained.

A ring 45 has threads 46 engaging threads 47 in the central passage of the sleeve 10. These threads are of a greater pitch than the threads 11. A pin 48 having threads 49 engaging the threads 46 of the ring 45 is mounted in a socket 50 formed in the sleeve 10. A plug 51 is adapted to force the pin 48 and likewise the threads 49 into locking engagement with the threads of the ring 45.

A pin 53 has threads 54 adapted to engage the threads 55 of a ring 56 which engages the threads 47 of the sleeve 10. A plug 57 threaded into a socket 58 is adapted to move the threads of the pin into engagement with the threads of the ring 56.

A pipe 60 is threaded at 61 into the outer threaded end of the sleeve 10 and said threads are of a less pitch than the threads of the rings 45 and 56 for a purpose which will be presently explained. The inner threaded ends of the pipe section 60 is provided with teeth 62 cooperating with similarly formed teeth on the outer expanded end 63 of the ring 56, for aiding in locking the ring to the pipe section 60.

A spring 65 is located between the inner adjacent ends of the rings 45 and 56 and has one end 66 seated within a socket 67 in the ring 45. The other end 68 of the spring is seated within a socket 69 formed in the ring 56. This spring tends to maintain the rings separated from each other.

The inner end of the threaded pin 12 is provided with teeth 70 coopearting with similarly formed teeth on the outer end of the ring 45. One portion of the spring 65 is located in a countersunk portion 71 of the ring 45, while the remaining portion is located within a countersunk portion 72 of the ring 56. In a like manner the spring 36 is located within a countersunk portion 73 forming a socket in the ring 25, while a similarly formed socket 74 is provided in the body member 14. The body member likewise has a shoulder 75 adapted at times to be engaged by the inner free end of the ring 25. The cam portions 16 and 17 on the body member 14 are adapted to cooperatively engage the cam members 76 and 77 of the sleeve 15.

Referring more particularly to Figs. 7 to 12, inclusive, it is seen that the sleeve 80 is of cylindrical shape and has a central passage therethrough of invariable sectional area. The intermediate portion of the central passage has less diameter than the opposite ends of the passage and is provided with threads 81 adapted to engage threads on a ring 82 and a ring 83 which have their inner ends in close association. A spring 84 has one end 85 seated within a recess 86 formed in the ring 82 while the other end 87 of the spring is seated within a recess 88 in the ring 83. This spring tends at all times to maintain the inner ends of the rings in spaced relation. It will be noted that ring 83 has a countersunk portion 89 forming a pocket to receive one portion of the spring, while a pocket 90 formed in the inner end of the ring 82 receives the remaining portion of the spring.

A pipe section 91 is threaded at 92 into one end of the sleeve 80 and has teeth 93 at its free end engaging similarly formed teeth on the outer flanged end 94 of the ring 83. The threads 92 are of a less pitch than the threads 81 formed in the sleeve 80.

The body member 95 having a central passage 96 provided with a threaded tapered end 97 is screwed onto the upper threaded portion 98 of the sleeve 80. The tapered portion or pin 97 has teeth 99 cooperating with similarly formed teeth on the outer end of the ring 82. A pipe section 100 is threaded at 101 onto the outer end of the body member 95. A ring 102 has threads 103 engaging similarly formed threads in the inner passage of the body 95. The threads 103, however, are of a greater pitch than the threads 101. The outer end of the ring 102 is expanded, as shown at 104 and has the outer free end provided with teeth 105 engaging similarly formed teeth on the pipe section 100.

A pin 106 has threads adapted to engage the threads 103 of the ring 102 and a plug 107 threaded into a socket 108 of the body member 95 forces the threads on the pin 106 into locking engagement with the threads of the ring 102.

A spring 110 has one end 111 received within a socket 112 formed within the body member 95. The other end 113 of the spring is received within the socket 114 in the ring 102. This spring tends to maintain the inner free end of the ring out of engagement with a shoulder 115 formed in the body member 95.

The operation of my device is as follows: The pipe 60 receives the lower end of a drill pipe coupling nearest to the bottom of the well, while the pipe 33 engages the upper end of the drill pipe coupling farthest away from the bottom. It is assumed that pipe 60 is supported vertically in the well by slips in a rotary table; that the collar 10 is assembled as shown and screwed on threads 61, as shown in Fig. 2; and that the collar assembly 14 and 15 is removed. During the application of the collar assembly 10, the set screws 51 and 57 are loose, permitting spring 65 full play on sleeves 56 and 45. The serrated ends 62 meet before collar 10 has reached the position shown in Fig. 2 since threads 46 and 61 being of the same type, such as right hand in this case, and the threads 47 are coarser than threads 61, no jamming of the teeth 62 will take place when sleeve 10 is screwed right-handedly, but will remain in slipping frictional contact. Spring 65, meanwhile tends to rotate the ring 45 outwardly from its position shown in Fig. 2. The assembly of sleeves 10 and 60 is now ready to receive the assembly consisting of the members 14, 15 and 25.

In a similar manner, sleeve 14 is screwed on pipe 33, while taking care that screw 28 is not exerting any pressure on pin 27, thus arresting the play of spring 36. The tapered pin 12 is screwed into the threads 11 of the body, with the serrated ends 70 meeting before the joint becomes tight, and when the squared lower shoulder on the sleeve 15 meets the upper straight shoulder of the sleeve 10. At this time the convolutions 77 and the shoulders 76 are in snug contacting relation with mating members 16, 17, 18. It will be appreciated that the convolutions 77 have the same pitch as threads 46. In this position of the elements just described, the springs 36 and 65 are under torsional stress tending to hold teeth 62, 70 and 32 in contact, while permitting right hand tightening of the threads 61, 11, and 34, under a right handed torsion.

If the torsion is reversed pipe 33 will begin to unscrew on threads 34 and a fraction of a turn outwardly, will be accompanied by an equal fractional turn of sleeve 25, because the teeth 32 are held in contact by the torsion spring 36. Since threads 26 are coarser than threads 34, the member 25 will move further axially than the pipe 33 from the same fractional turning, and there would insue a violent jamming between the threads 26 and 34, effectually preventing pipe 33 from unscrewing from the sleeve 14. This reverse torsion value is equal to the stripping strength of threads 34 or the fracturing off of pipe 33 at its weakest point.

In order to remove pipe 33 from sleeve 14, it is necessary to slightly tighten set screw 28, and thus lock screw 25 against the action of spring 36, then screw pipe 33 right handedly in the sleeve 14 until the teeth 32 slip on each other, then by holding sleeve 14 stationary, in any approved manner, pipe 33 can be unscrewed from sleeve 14 without withdrawing sleeve 25. Threads 11 on pin 12 can be tightened right-handedly but when torsion is reversed causing a fractional turn of pipe 12 left-handedly, sleeve 45 will have made an equal fractional turn and advanced outwardly further than pin 12. This would cause jamming between threads 11, 46, and 47. When the taper of threads 11 is large and the pitch is coarse, a fractional left hand turn provides certain looseness in threads 11 before teeth 70 become firmly set, particularly if there be a back lash or loose fit in threads 46 and 47. This back lash looseness is not large enough to constitute a fault, but the looseness referred to above is comparative in relation to the slack on sleeve 15, where slack is practically nonexistent, and independent of slack on threads 46, 47.

The convolutions 77 and 72, and shoulders 76, and their mating surfaces 17 and 18 have no back lash under any circumstances. If left hand torsion is put on sleeve 14 and sleeve 10 is held stationary, the joint of convolutions 77 and shoulder 76 will loosen more readily than joint 120 because the angularity of the convolutions 77 relative to the axis, is greater than the square ended shoulders of sleeves 15 and 10 and, greater than the pitch of threads 11. Therefore if sleeve 14 is rotated in a fractional left hand turn, sleeve 15 remains bound as an integral formation with the sleeve 10, slippage taking place on the convolutions 77. But convolutions 77 have a greater pitch than threads 11, therefore, the sleeve 15, virtually speaking, would grow longer faster than threads 11 would recede from the sleeve 10. This jamming is without back lash loss, and therefore more suitable in case pin 12 has a large taper and threads 11 are very coarse.

In order to unscrew pin 12 from sleeve 10 it is necessary to tighten set screw 51 to eliminate spring 65 from action and then exert a right handed torsion on sleeve 14, being careful that the pipe tongs are engaged on sleeve 14 and not touch sleeve 15. This will cause slippage of teeth 70, but since spring 65 is held inactive on sleeve 45, the contacts between the teeth 70 remain broken. It will be appreciated that very minute fractional right handed angular revolution of sleeve 14 is only necessary to break the contact between teeth 70, because the serrations 62, shown in Fig. 3, are very small and only one tooth space movement is required to break the engagement between the teeth 70.

If now the pipe tongs are applied to sleeve 15 and a left handed torsion is exerted, shoulders 76 will engage the mating shoulders on sleeve 14, and the torsion on sleeve 15 is transmitted to sleeve 14, breaking the contact of threads 11, and on squared shoulders 120 simultaneously. Pin 48 pressed by screw 50 on the threads 46, prevents sleeve 45 from being withdrawn with pin 12. Sleeve 15 can not be crushed or deformed by the use of the pipe tongs regardless of the pressure exerted, because the looseness of the fit between the interior of the sleeve 15 and the exterior of neck 13 is less than the elastic limit of distorsion on sleeve 15. It is to be understood in order to have the entire length of drill pipe capable of reverse torsion, the coupling just described, must be placed between each length of drill pipe. It is equally clear that if set screws 28, 51, and 57 are tightened and springs 36 and 65 thereby neutralized before the couplings are made up, all the joints but pin 12 would be incapable of resisting reverse torsion. Pin 12 would be locked by the action of sleeve 15, but sleeve 45 would be neutral.

If sleeve 15 is only used to lock pin 12, the time required to unscrew and screw together this type of joint will remain the same as is required for the type of joint now used in the single direction torsion joints. Threads 34 and 61 are seldom, if ever, loosened up.

The construction shown in Figs. 7 and 8 are simpler and cheaper forms of coupling which conform more nearly to the common tool joint now in use. The added features include the sleeves shown in Figs. 9 and 10, springs 84 and 110, pins such as 106, screws 107, in combination with the serrated ends 93 on pipe 91, and the interior threads 81 convert the joints into a locked joint. The function of this joint is exactly the same as that of the coupling shown in Figs. 1 and 2, previously described, differing only in that when pin 97 is tightened or loosened, the pipe tongs may be applied on any section of sleeve 95. The set screw 98 must be loose when the pin 97 is made tight, either by tongs or other working conditions in the well, so that spring 84 has full freedom to urge serrations 99 together. In loosening pin 97 from sleeve 80, the set screw 98 controlling sleeve 82 and the action of spring 84, must be locked, section 80 being held against rotation, and sleeve 95 is rotated right handedly sufficiently to force a slippage of one or more teeth on serrations 99. Then the sleeve 80 must be held and sleeve 95 rotated left handedly, thus unscrewing threads 98 from sleeve 80, without hindrance by sleeve 82. It is evident that this design is cheaper to manufacture and where the taper on pin 97 is not very great, and threads 98 not very coarse, the locking action is sufficiently rapid.

I claim:—

1. A device of the character described comprising a coupling sleeve having the opposite ends internally threaded, a second sleeve having one end threaded into one end of the coupling sleeve, the intermediate portion of the coupling sleeve having internal threads of a greater pitch than the threads at the opposite ends, rings threaded into the intermediate threads of the coupling sleeve, a spring tending to rotate the rings and maintain said rings outwardly from each other, means provided on the outer ends of the rings adapted to engage pipe ends threaded into the opposite ends of the coupling sleeve for aiding in preventing relative rotation between the pipe ends and the coupling sleeve.

2. A device of the character described comprising a coupling sleeve having the opposite ends internally threaded, a second sleeve having one end threaded into one end of the coupling sleeve, the intermediate portion of the coupling sleeve having internal threads of a greater pitch than the threads at the opposite ends, rings threaded into the intermediate threads of the coupling sleeve, a spring tending to rotate the rings and maintain said rings outwardly from each other, means provided on the outer ends of the rings adapted to engage pipe ends threaded into the opposite ends of the coupling sleeve for aiding in preventing relative rotation between the pipe ends and the coupling sleeve, a ring threaded into the second sleeve, and a spring tending to rotate the last mentioned ring relative to the second sleeve.

3. A device of the character described comprising a coupling sleeve having the opposite ends internally threaded, a second sleeve having one end threaded into one end of the coupling sleeve, the intermediate portion of the coupling sleeve having internal threads of a greater pitch than the threads at the opposite ends, rings threaded into the intermediate threads of the coupling sleeve, a spring tending to rotate the rings and maintain said rings outwardly from each other, means provided on the outer ends of the rings adapted to engage pipe ends threaded into the opposite ends of the coupling sleeve for aiding in preventing relative rotation between the pipe ends and the coupling sleeve, a collar on the second sleeve and having one end abutting an end of the coupling sleeve, cooperating cam members on the collar and second sleeve for causing a binding action between the adjacent ends of the second sleeve and coupling sleeve.

4. A device of the character described comprising a coupling sleeve having the opposite ends internally threaded, a second sleeve having one end threaded into one end of the coupling sleeve, the intermediate portion of the coupling sleeve having internal threads of a greater pitch than the threads at the opposite ends, rings threaded into the intermediate threads of the coupling sleeve, a spring tending to rotate the rings and maintain said rings outwardly from each other, means provided on the outer ends of the rings adapted to engage pipe ends threaded into the opposite ends of the coupling sleeve for aiding in preventing relative rotation between the pipe ends and the coupling sleeve, a collar on the second sleeve and having one end abutting an end of the coupling sleeve, cooperating cam members on the collar and second sleeve for causing a binding action between the adjacent ends of the second sleeve and coupling sleeve, the second sleeve being provided with a curved groove, a ball carried by the collars and engaging the groove for limiting the rotary movement of the collar relative to the second sleeve.

GUSTAVUS A. MONTGOMERY.